(12) United States Patent
Nickol

(10) Patent No.: US 7,575,459 B2
(45) Date of Patent: Aug. 18, 2009

(54) CONNECTOR FOR ELECTRICAL AND OPTICAL CABLES

(75) Inventor: Marcell Nickol, Scherbda (DE)

(73) Assignee: Weidmuller Interface GmbH & Co. KG, Detmold (DE)

( * ) Notice: Subject to any disclaimer, the term of this patent is extended or adjusted under 35 U.S.C. 154(b) by 0 days.

(21) Appl. No.: 12/284,796

(22) Filed: Sep. 25, 2008

(65) Prior Publication Data

US 2009/0088018 A1 Apr. 2, 2009

(30) Foreign Application Priority Data

Sep. 28, 2007 (DE) .................. 20 2007 013 637 U

(51) Int. Cl.
*H01R 13/62* (2006.01)

(52) U.S. Cl. .................. 439/314; 439/253; 439/320; 439/372

(58) Field of Classification Search ......... 439/253–256, 439/312, 313, 314, 316, 317–320, 322, 323, 439/361, 362, 365, 368, 372
See application file for complete search history.

(56) References Cited

U.S. PATENT DOCUMENTS

| | | | | |
|---|---|---|---|---|
| 3,173,473 A | * | 3/1965 | Loveland | ............. 431/80 |
| 4,521,064 A | * | 6/1985 | Knapp et al. | ............. 439/153 |
| 5,647,776 A | * | 7/1997 | Duclos et al. | ............. 439/752 |
| 5,662,488 A | * | 9/1997 | Alden | ............. 439/314 |
| 6,099,329 A | * | 8/2000 | Goff et al. | ............. 439/131 |
| 6,267,612 B1 | * | 7/2001 | Arcykiewicz et al. | ............. 439/253 |
| 6,280,229 B1 | * | 8/2001 | Harting et al. | ............. 439/393 |
| 6,692,285 B2 | * | 2/2004 | Islam | ............. 439/352 |
| 6,769,926 B1 | * | 8/2004 | Montena | ............. 439/253 |
| 6,811,422 B1 | * | 11/2004 | Muller | ............. 439/314 |
| 7,491,081 B2 | * | 2/2009 | Fehling et al. | ............. 439/320 |
| 2003/0082942 A1 | * | 5/2003 | Wlos | ............. 439/348 |
| 2009/0088018 A1 | * | 4/2009 | Nickol | ............. 439/372 |

FOREIGN PATENT DOCUMENTS

DE 20 2006 003 400 U1 8/2007

* cited by examiner

*Primary Examiner*—James Harvey
(74) *Attorney, Agent, or Firm*—Lawrence E. Laubscher, Sr.; Lawrence E. Laubscher, Jr.

(57) ABSTRACT

A plug and socket connector arrangement for electrical or fiber optic cables includes a pair of tubular locking sleeves mounted for axial and rotational displacement on the plug and connector bodies, which locking sleeves have adjacent ends provided with internal and external screw threads, respectively. The adjacent sleeve ends each contain a plurality of circumferentially spaced longitudinal slits that define a plurality of resilient threaded sectors. After the plug and socket connectors are brought into connected engagement, the locking sleeves are successively displaced from retracted separated positions axially together toward an adjacent locked position, whereby the resilient inner sleeve sectors are initially radially expanded, and the resilient outer sleeve sectors are subsequently radially contracted. The inner and outer screw threads are thus brought into threaded engagement, whereupon the locking sleeves are slightly relatively rotated to lock the sleeves together.

8 Claims, 2 Drawing Sheets

CONNECTOR FOR ELECTRICAL AND OPTICAL CABLES

BACKGROUND OF THE INVENTION

1. Field of the Invention

A plug and socket connector arrangement includes a pair of tubular locking sleeves mounted for axial and rotational displacement on the plug and socket connector bodies, which locking sleeves have adjacent ends provided with internal and external screw threads, respectively, which adjacent ends contain a plurality of longitudinal slits that define a plurality of circumferentially spaced resilient threaded sectors. After the plug and socket connectors are brought into connected engagement, the locking sleeves are successively displaced from retracted separated positions axially together toward an adjacent locked position, whereby the resilient inner sleeve sectors are initially radially expanded, and the resilient outer sleeve sectors are subsequently radially contracted, thereby bringing the inner and outer screw threads into threaded engagement, following which the locking sleeves are slightly relatively rotated to lock together the locking sleeves and the plug and socket connectors.

2. Description of Related Art

Many types of electrical plug and socket connector arrangements are known, especially along the so-called M standard (for example, "M12"). In the simplest case, the plug parts are equipped with a rotatable sleeve that has a screw thread. Such designs make it necessary after the combination of the plug-in contacts to bring about a screwing-together over the entire length of the screw thread. This requires an appreciable time expenditure, especially when making a plurality of such plug-in connections. On the electrical connectors commonly used in the automation technology, the connections for this purpose are often arranged relatively close to each other, which likewise increases the time expenditure and makes connection rather laborious.

This is why plug parts and corresponding sockets of plug-in connections were created; they make it possible to insert the sleeve on the side of the plug part into the socket by simply inserting it and, at the end of the assembly procedure, they facilitate a final and axial locking between the two parts by means of a slight rotation. This is disadvantageous in that the past designs necessitate a rather expensive production and processing both of the sleeve of the plug part and the processing of the socket inasmuch as the currently known designs are based on the idea that they contain either bayonet-like connection possibilities or that both the sleeve of the plug part and the socket must be provided with thread-free areas running along the axial direction, which then facilitate an axial combination or connection without the need for a rotation and which permit an axial securing only at the last moment by means of a rotation. In the latter variant, a connection is made to an inside screw thread that is not provided with the axially free areas and, furthermore, in that way, one cannot achieve any time gain when compared to known screw operations.

It is also known that a sleeve of the socket part that has an internal screw thread can be subdivided into ring segments, which, after insertion of the plug part, are folded inward and are then locked. Handling is made easier, of course, only if the sleeve is designed in this fashion.

The German published application No. DE 20 2006 003 400 discloses a typical electrical plug-in connection with a plug part with a sleeve for purposes of connection with a socket that has an internal screw thread, whereby the sleeve on its external circumferential area engaging the socket is equipped with at least one deflectable, preferably elastically deflectable, projection that is fashioned in the manner of a part of an external screw thread turn.

As an alternative, one might conceive equipping the socket with its internal circumference area receiving the sleeve with at least one deflectable, preferably elastically deflectable projection shaped in the manner of a part of an internal screw thread turn. The sleeve must in this case be provided with an outer screw thread for connection with the socket.

This plug-in connection has proven to be effective. But there is a need for another fast connection system, which, in particular, can also be coupled in a simple manner with plug parts or socket parts that are not designed with devices for fast connection.

SUMMARY OF THE INVENTION

Accordingly, it is a primary object of the present invention to provide on a plug and socket connector arrangement a pair of colinearly-arranged inner and outer locking sleeves having adjacent ends that are externally and internally threaded, respectively, which adjacent ends contain a plurality of longitudinal slits that define a plurality of circumferentially spaced resilient sectors, respectively, the resilient sectors being radially expanded and radially contracted, respectively, as the locking sleeves are axially displaced together, thereby to produce engagement between the screw threads, whereby upon slight relative rotation of the locking sleeves, the locking sleeves and the plug and socket connectors are locked together.

According to a more specific object of the invention, a divergent conical portion integral with one end of one connector body produces the radial outward expansion of the resilient sectors of the inner locking sleeve, and a tubular collar slidably provided on the outer locking sleeve produces radial inward contraction of the resilient sectors of the outer sleeve as the two locking sleeves are axially displaced together.

The present invention provides an electrical or optical plug-in connection with a plug part with an internal body with a first electrically conducting or light-conducting contact, whereby the interior body is surrounded by a sleeve having an outer screw thread with a socket part with an internal body that can be assembled together with the internal body of the plug part with the second electrically conducting or light-conducting contacts corresponding to the first contacts.

The internal body is surrounded by a locking sleeve that has an internal screw thread, and the internal screw thread and the external screw thread are designed for the purpose of engaging each other, and both the sleeve of the plug part and that of the socket part are subdivided in at least two or more sectors distributed over the circumference, where the sectors can preferably be elastically and radially deflected at their free end.

Both plug and socket connector parts in each case are provided with sleeves that preferably have radially elastic ring segments; therefore, one can achieve a particularly easily handled and workable plug-in connection, which also will be compatible with the plug and socket parts especially according to the M standard without sleeves that feature such a subdivision of the screw threads into ring segments. This, moreover, also provides compatibility with relatively many known "fast connection systems," which have until now been developed for the "M standard."

Preferably, the sleeves of the plug part and of the socket part can be moved and rotated axially with respect to the particular internal bodies. Here it is practical when the internal body of the plug part on its end facing toward the free end of the plug part has a widening segment and the outer collar of the socket part on its end pointing toward the free end of the socket part has a tapering section that is designed to make sure that the sectors will run up on them during axial shifting so that the ring segments of the plug part will be spread apart outward and so that the ring segments of the socket part will be spread apart inside so that they will engage each other, whereby the ring segments of the socket part will be supported on the outer collar.

The following special advantage must be emphasized: The full compatibility with plug and socket parts of known design is preserved, that is to say, the plug part and also the socket part are likewise compatible with conventional plug parts and socket parts of the corresponding M standard that depends on the dimensions (for example, M8 or M12). Here again, one can provide for a fast connection without screws in that the sleeve is first pushed back and that the internal bodies are then stuck into each other, whereupon by axially moving the sleeve, the sleeves are locked as they run up on the widening or tapering section. The sleeves are then easily turned.

BRIEF DESCRIPTION OF THE DRAWINGS

Other objects and advantages of the invention will become apparent from a study of the following specification, when viewed in the light of the accompanying drawing, in which:

FIG. 1b is a detailed view of the portion indicated by the box outline in FIG. 1a;

FIG. 1c is a perspective view of the disassembled apparatus of FIG. 1a;

FIG. 2b is a detailed view of the portion indicated by the box outline in FIG. 2a; and FIG. 2c is a perspective view of the apparatus of FIG. 2a.

DETAILED DESCRIPTION OF THE INVENTION

Figure 1A:
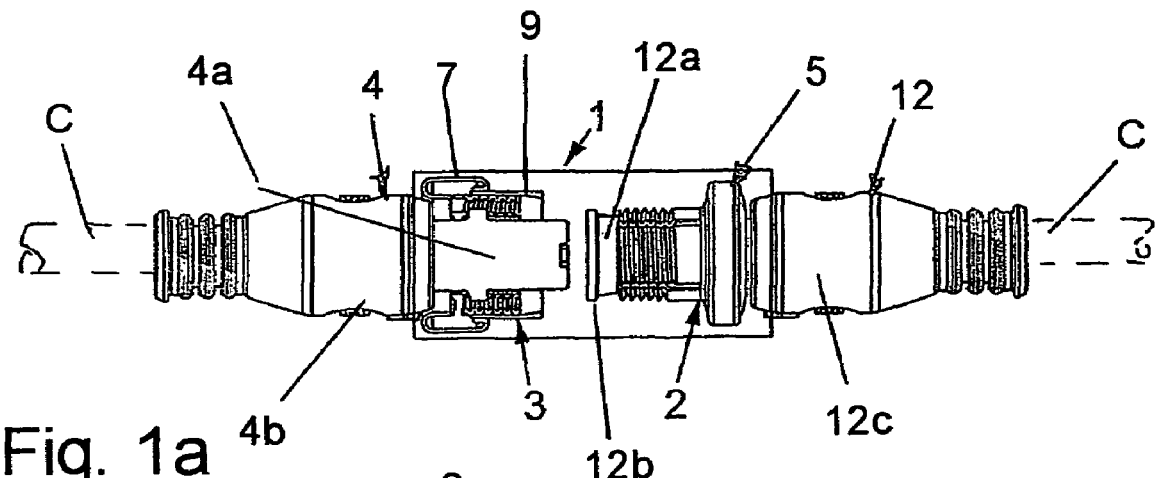
FIG. 1a is a side elevation view of the connector components prior to assembly.
Figure 1B:
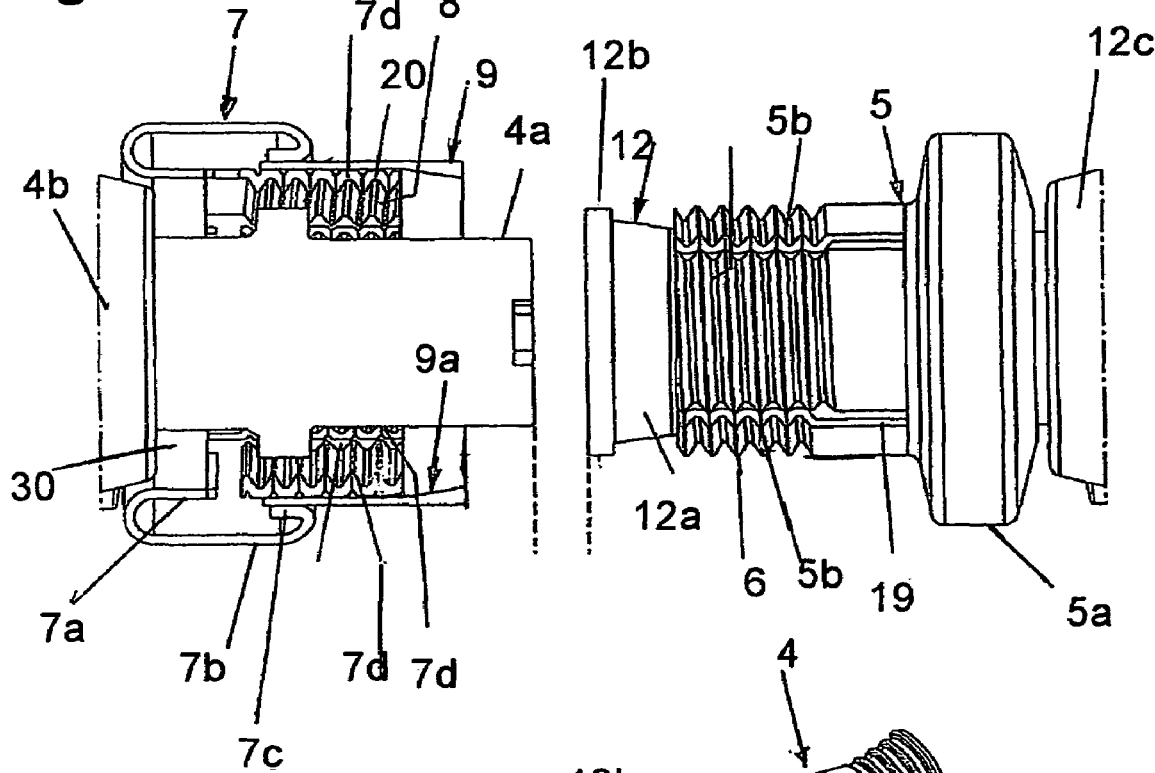
Figure 1C:
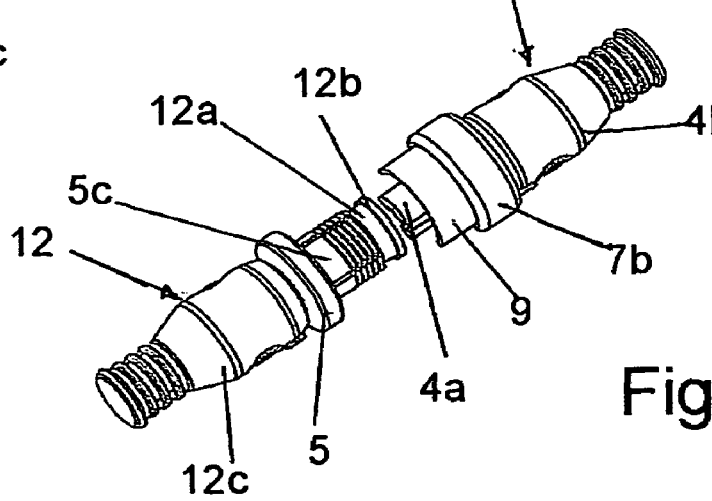

Referring first more particularly to FIGS. 1a-1c, the connector apparatus for connecting together a pair of electrical or fiber optic cables C and C' include colinearly-arranged plug and socket connectors 2 and 3 having a plurality of corresponding male and female contacts, respectively (not shown). The plug connector includes a plug body 12 formed from an electrically insulating synthetic plastic material and including a free first end portion 12a that is conical and diverges outwardly in the direction of the socket and which terminated in an annular stop flange 12b. The socket body 4 is similarly formed from a synthetic plastic insulating material and includes an integral first end portion 4a adjacent the plug body first end portion.

Mounted for axial and rotational displacement on the plug first end portion is a tubular inner locking sleeve member 5 having a first end portion carrying a plurality of external screw threads 6, and a second end portion including an enlarged annular operating flange 5a. The first end portion of the inner sleeve 5 contains a plurality of slits 19 that extend longitudinally from the free end of the sleeve, thereby to define a plurality of circumferentially-spaced partially-eternally-threaded resilient sectors 5b. Mounted for rotational and axial displacement of the first end portion 4a of the socket body 4 is a tubular outer locking sleeve member 7 having at a first end adjacent the plug connector 2, which first end is provided with a plurality of internal screw threads 8. The outer sleeve first end contains a plurality of longitudinal slits 20 that define a plurality of circumferentially-spaced partially-internally-threaded resilient sectors 7d. The inner and outer locking sleeve members 5 and 7 are formed from a resilient metal or synthetic plastic material.

At its other end, the outer sleeve member 7 is supported by and fixed to the socket body 4 by annular support member 30, which outer sleeve member includes a first reversely-bent-back portion 7b that defines an operating flange, and a second double reversely-bent-back concentrically-spaced portion 7c that frictionally engages the outer circumferential surface of an axially displaceable rigid tubular collar member 9 arranged concentrically about said outer sleeve member. At its free end, the collar member 9, which is formed from a rigid metal or synthetic plastic material, extends axially beyond the outer sleeve member 7 opposite the annular operating flange portion 5a of the inner sleeve 5, which collar free end is provided on its inner circumferential surface with a convergent inwardly-tapered end portion 9a.

Operation

Assume that the cable connecting apparatus is initially in the disconnected condition of FIG. 1a-1c, and that the locking sleeves 5 and 7 are in their illustrated retracted unlocked positions relative to the plug and socket bodies 12 and 4, respectively. At this time, the resilient sectors 5b of the inner locking sleeve 5 and the resilient sectors 7d of the outer locking sleeve 7 are resilient biased toward their initial circumferentially-spaced circular relationship, thereby to define a tubular pattern, respectively.

Figure 2A:
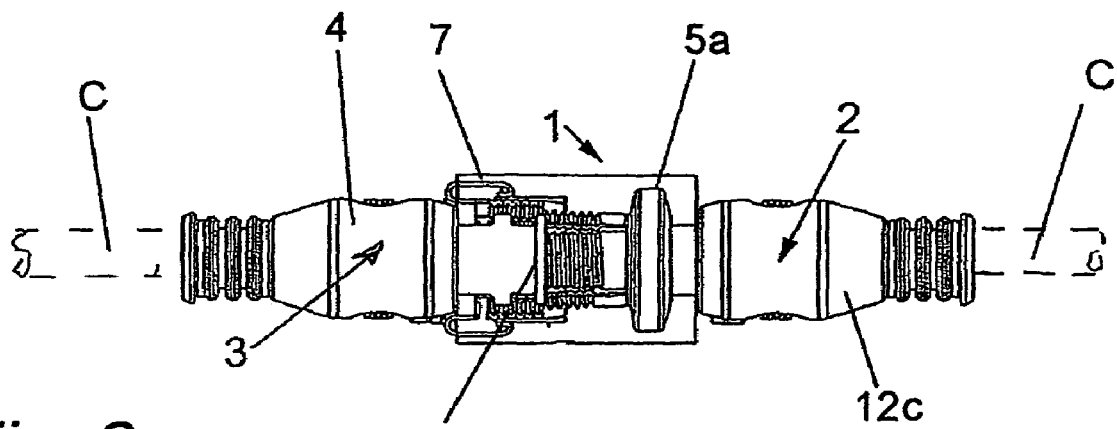
FIG. 2a is a side elevation view of the connector apparatus in an assembled partially-locked condition.
Figure 2B:
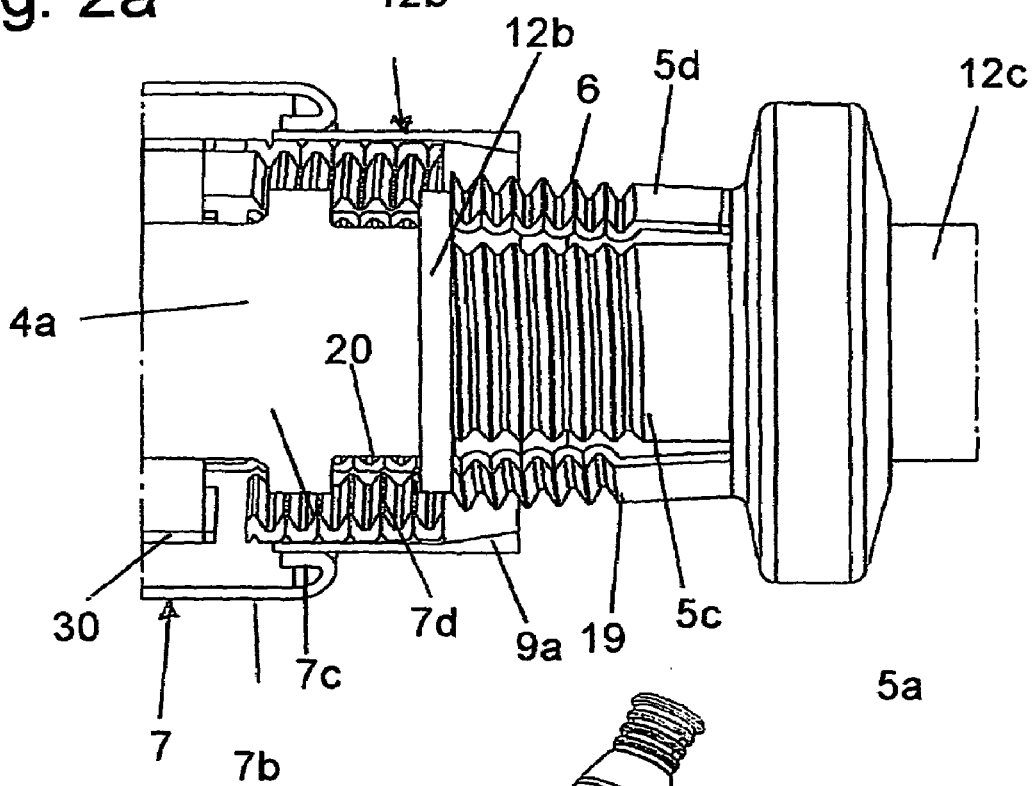
Figure 2C:
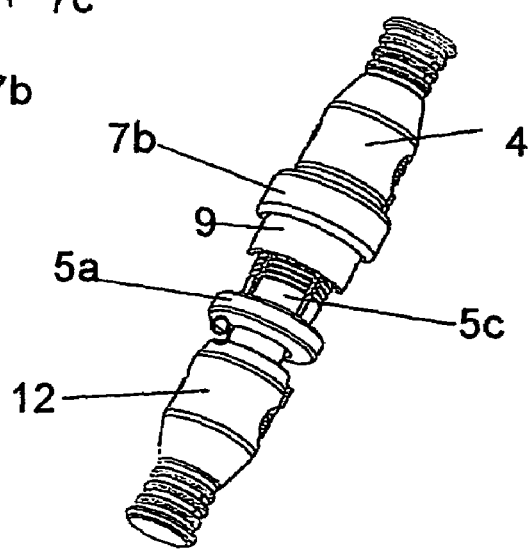

The plug and socket connectors 2 and 3 are then axially displaced together toward the connected condition shown in FIGS. 2a-2c, thereby to connect the associated the plug and socket contacts, respectively. The inner locking sleeve 5 is then axially displaced to the left manually by grasping the enlarged flange portion 5a, thereby to effect radial expansion of the resilient sectors 5d of the first locking sleeve 5 by the divergent conical portion 12a of the plug body, as best shown in FIG. 2b. The operating flange portion 7b of the outer locking sleeve is then grasped to displace to the right relative to the socket body the second locking member 7, together with the collar member 9 carried thereby. The collar member 9 is brought into abutting engagement with the enlarged annular flange portion 5a of the of the first locking sleeve 5a, and upon further displacement to the right of the second locking sleeve 7 relative to the collar 9, the resilient sectors 7d of the second locking sleeve are deflected radially inwardly by the convergent tapered surface 9a to cause the internal screw threads 8 to engage the external screw threads 6 on the inner locking sleeve. The two locking sleeves 5 and 7 are then relatively rotated slightly (i.e., by a quarter or half turn) to lock the sleeves together, thereby to maintain the plug and socket connectors in the engaged condition.

To release the locked connector assembly, the locking sleeves are relatively rotated in the opposite direction through a small angle, and are then axially displaced apart, whereupon the sectors 7d of the outer locking sleeve will spring outwardly to disengage the inner and outer screw threads. The assembly is now unlocked for axial separation of the plug and socket connectors.

Screw threads 6, 8 are subdivided into screw thread segments that can be compatible with standard screw threads. It is conceivable to make sleeves 5, 7 of one piece when the resilient sectors 5b and 7d in each case are connected with each other in one piece in an area that lies away from the free end (for example, in the area of the annular operating portions 5a and 7b).

Screw threads 6, 8 at the end of this movement fully engage each other in a form-locking manner. This design is so chosen in a self-inhibitory fashion that the sleeves cannot become separated from each other without external force action. As an alternative, one can provide an optional locking element (not illustrated here).

Separation is performed by slightly turning the sleeves and by subsequently axially moving the sleeves backward to release the screw thread turns of screw threads 6, 8 from each other and by means of a subsequent axial pulling apart of the connector bodies 4, 12 against the plug-in direction.

While in accordance with the provisions of the Patent Statutes the preferred forms and embodiments of the invention have been illustrated and described, it will be apparent to those skilled in the art that changes may be made without deviating from the invention described above.

What is claimed is:

1. A connector arrangement for connecting together a pair of electrical cables or optical cables, comprising:
    (a) a cylindrical plug body (12) having a first end provided with a plurality of plug contacts;
    (b) a cylindrical socket body (4) having at one end a plurality of socket contacts arranged for engagement with said pin contacts when said first ends of said plug and socket bodies are axially displaced colinearly toward an engaged condition; and
    (c) locking means for locking said plug and socket bodies together when in said engaged condition, including:
        (1) an inner tubular locking sleeve (5) mounted for axial and rotational displacement concentrically about one of said plug and body first ends;
        (2) an outer tubular locking sleeve (7) mounted for axial and rotational displacement about the other of said plug and body first ends;
        (3) said inner and outer locking sleeves being colinearly arranged and having adjacent first ends carrying external (6) and internal (8) screw threads, respectively, said adjacent first ends each containing a plurality of circumferentially spaced longitudinal slits (19, 20) that define a plurality of resilient circumferentially-spaced split threaded sectors (5b, 7d); and
        (4) deforming means (9a, 12a) operable upon axial displacement of said locking sleeves on said plug and socket bodies from separated unlocked positions toward adjacent locked positions for displacing said resilient split threaded sectors radially outwardly and radially inwardly toward concentrically-arranged positions in mutually-threaded engagement, respectively, whereby upon slight relative rotation of said sleeves, said sleeves are locked against axial separation.

2. A connector arrangement as defined in claim 1, wherein said deforming means comprises expansion means carried by one of said plug and socket bodies for radially expanding said threaded sectors of said inner locking sleeve.

3. A connector arrangement as defined in claim 2, wherein said expansion means comprises an integral conical portion (12a) of the connector body associated with said inner sleeve member, said integral conical portion being divergent in the direction of the other connector body.

4. A connector arrangement as defined in claim 3, wherein said integral conical portion terminates adjacent the other connector body in an annular stop flange (12b) arranged for abutment by the resilient threaded sectors of said inner locking sleeve when said inner locking sleeve is in said locked position.

5. A connector arrangement as defined in claim 3, wherein said deforming means further includes contraction means (9a) carried by the other of said plug and socket bodies for radially contracting said threaded sectors of said outer locking sleeve.

6. A connector arrangement as defined in claim 5, wherein said inner locking sleeve has an enlarged annular integral operating flange portion (5a), and further wherein said contraction means comprises an annular collar member (9) arranged for axial sliding displacement concentrically about said second locking sleeve, said collar member having a first end portion that extends axially beyond said second locking sleeve for engagement with the inner locking sleeve operating flange portion, said collar member having on its inner circumference a convergent tapered surface (9a), so that when said outer locking sleeve is initially axially displaced toward said first locking sleeve, said collar is brought into stationary abutting engagement with said operating flange portion, and upon further displacement of said outer locking sleeve toward said locked condition, said outer locking sleeve displaced relative to said collar member, thereby causing the resilient circumferentially-spaced split threaded sectors of said outer locking sleeve to be displaced radially inwardly by said convergent tapered surface on the inner circumferential surface of said collar member.

7. A connector arrangement as defined in claim 6, wherein said outer locking sleeve (7) includes at its other end an integral reversely-bent-back concentrically-spaced annular operating portion (7b) that defines a grasping area for manually displacing said second locking sleeve relative to said socket body.

8. A connector arrangement as defined in claim 7, wherein said outer locking sleeve operating portion includes a further double-reversely-bent back retaining portion (7c) that is in frictional engagement with the outer circumferential surface of said collar member.

* * * * *